(12) United States Patent
Gautam et al.

(10) Patent No.: US 8,392,463 B2
(45) Date of Patent: Mar. 5, 2013

(54) GPU ENABLED DATABASE SYSTEMS

(75) Inventors: Akshay Gautam, New Delhi (IN); Ritesh K. Gupta, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 12/765,459

(22) Filed: Apr. 22, 2010

(65) Prior Publication Data

US 2011/0264626 A1 Oct. 27, 2011

(51) Int. Cl.
*G06F 17/30* (2006.01)
*G06F 17/00* (2006.01)

(52) U.S. Cl. ......... 707/795; 707/796; 709/201; 709/220

(58) Field of Classification Search .......... 707/964–975, 707/795, 796; 709/201, 220
See application file for complete search history.

(56) References Cited

U.S. PATENT DOCUMENTS 7,792,822 B2 * 9/2010 Galindo-Legaria et al. .. 707/715
7,970,872 B2 * 6/2011 Liu et al. ....................... 709/220

FOREIGN PATENT DOCUMENTS

WO WO 2008/090336 A2 7/2008

OTHER PUBLICATIONS

Ding et al., "Using Graphics Processors for High Performance IR Query Processing", IW3C2 2009, Madrid, Spain, 10 pp.
Fang et al., "GPUQP: Query Co-Processing Using Graphics Processors", SIGMOD 2007, Beijing, China, 3 pp.
Gosink et al., "Data Parallel Bin-Based Indexing for Answering Queries on Multi-Core Architectures", IDAV 2009, Davis, California, 19 pp.

Govindaraju et al., "Fast Computation of Database Operations using Graphics Processors", SIGMOD 2004, Paris, France, pp. 206-217.
Govindaraju et al., "GPUTeraSort: High Performance Graphics Co-processor Sorting for Large Database Management", SIGMOD 2006, Chicago, Illinois, 12 pp.
Hardavellas et al., "Database Servers on Chip Multiprocessors: Limitations and Opportunities", 2007 Asilomar California USA, 3rd Biennial CIDR (Conf on Innovative Data Research), 9 pp.
Manavski, et al., "CUDA compatible GPU cards as efficient hardware accelerators for Smith-Waterman sequence alignment", BITS 2007, Naples, Italy, 9 pp.
Ailamaki et al., "DBMSs on a Modern Processor: Where Does Time Go?" Edinburgh Scotland (GB) 1999, 25th VLDB Conf, 12 pp.
Ailamaki et al., "Query Co-Processing on Commodity Processors", Seoul KR, Sep. 2006, VLDB '06, 1 pp.
Zukowski, et al., "MonetDB/X100—A DBMS in the CPU Cache", 2005 IEEE Bulletin, 6 pp.
NVIDIA CUDA™ Programming Guide, Ver 2.1, Dec. 2008.

(Continued)

*Primary Examiner* — Yicun Wu
(74) *Attorney, Agent, or Firm* — Kali Law Group, P.C.

(57) ABSTRACT

Methods for parallel query execution of a database operation on a database utilizing a graphics processing unit (GPU) are presented including: receiving query by a host, the query including database relations; starting a GPU kernel, where the GPU kernels include a GPU memory; hash partitioning the database relations by the GPU kernel; loading the partitioned database relations into the GPU memory; loading keyed partitions corresponding the hash partitioned database relations into the GPU memory; building a hash table for a smaller of the hash partitioned database relations; and executing the query. In some embodiments, methods further include returning a result of the query. In some embodiments, methods further include when the query is a long query including a number of operators, parsing the long query into a number of sub-queries; for each of the sub-queries, starting one of the GPU kernels such that the sub-queries are processed in parallel.

22 Claims, 7 Drawing Sheets

OTHER PUBLICATIONS

Ke et al., "Application of graphics processors to database technologies Application of graphics processors to database technologies", JRNL of Zhejiang Univ (Engineering Science) 2009 vol. 43 No. 8, pp. 1349-60, Abstract only.

Luebke, et al., "GPGPU: General Purpose Computation on Graphics Hardware" SIGGRAPH 2004, 88 pp.

Poster presentation, "Palo+GPU: A CUDA-Powered in-Memory OLAP Server" Sep. 30, 2009, NVIDIA GPU Tech. Conf., San Jose, CA. 1 pp.

Press Release, "Palo Global Roadshow 2010 Starts in Germany", Apr. 13, 2010, Pressebox, 2 pp.

Article, "New on CUDA Zone: Palo GPU from Jedox", Apr. 16, 2010, CUDA: Week in Review Issue #17, NVIDIA Corp. (Global Newsletter) 3 pp.

Govindaraju et al., "Fast computation of database operations using graphics processors", Jun. 2004, SIGMOD Jun. 13-18, 2004 (Paris FR), ACM, New York NY, 12 pp.

He et al., "Relational query coprocessing on graphics processors", Sep. 2009, Transactions on Database Systems 34, 4 (2009), ACM, New York, NY, 35 pp.

Letter re Third party submission by Dr. Tobias Lauer, Dec. 16, 2011, 3 pp.

IBMsolidDB Administrator Guide, Ver. 6.1, Jun. 2008, pp. 1-89 & title page.

Di Blas et al., "Data Monster—Why graphics processors will transform database processing", Sep. 2009, New York, US, Spectrum IEEE, vol. 46 No. 9, pp. 46-51, New York, NY, US.

Cieslewicz et al., "Database Optimizations for Modern Hardware", May 2008, Proceedings of the IEEE, vol. 96, No. 5, pp. 863-878, New York, NY, US.

Bingsheng He et al., "Relational Joins on Graphics Processors", 2008, ACM Sigmod Int'l Conf on Mgmt of Data, Vancouver, BC, CA, 14 pp.

Bingsheng He et al., "Relational Query Coprocessing on Graphics Processors", Dec. 2009, ACM Transactions on Database Systems, vol. 34, No. 4, Article 21, pp. 1-39, New York, NY, US.

PCT International Search Report, PCT/EP2011/055032 filed Mar. 31, 2011, together with the Written Opinion of the ISA, mailed Jul. 27, 2011, 11 pp.

\* cited by examiner

GPU ENABLED DATABASE SYSTEMS

BACKGROUND

Traditional database systems execute database queries on disk-based tables. Research has shown that traditional disk-based database query execution often suffers from high penalties arising from, for example, memory latencies, processors waiting for data to be fetched from the memory, and L1 data and L2 instruction stalls. Therefore, to tackle this problem, multiprocessors are being increasingly utilized for executing database queries. Complementary to the disk-based tables are the in-memory tables. In-memory tables are faster than disk-based tables because the fetching from and loading to the disk component is eliminated. In-memory enabled systems can therefore use more efficient techniques to provide maximum performance.

A Graphics Processing Unit (GPU) is a massively parallel piece of hardware which can be thought of as several processors with its own local memory. A GPU may operate as an independent co-processor within the host computer. Back in the late nineties, the games industry provided the necessary impetus for the development of the GPU for accelerating graphics in games. Recently, architectures have been configured to support programmability. That is, general-purpose programs may be written to run on the GPU. GPU enabled programs are well suited to problems that involve data-parallel computations where the same program is executed on different data with high arithmetic intensity.

As such, GPU enabled database systems are presented herein.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for parallel query execution of a database operation on a database utilizing a graphics processing unit (GPU) are presented including: receiving query by a host, the query including database relations; starting a GPU kernel, where the GPU kernels include a GPU memory; hash partitioning the database relations by the GPU kernel; loading the partitioned database relations into the GPU memory; loading keyed partitions corresponding the hash partitioned database relations into the GPU memory; building a hash table for a smaller of the hash partitioned database relations; and executing the query. In some embodiments, methods further include returning a result of the query. In some embodiments, methods further include when the query is a long query including a number of operators, parsing the long query into a number of sub-queries; for each of the sub-queries, starting one of the GPU kernels such that the sub-queries are processed in parallel; and returning to the hash partitioning. In some embodiments, the host is a CPU, and database data and database keys are stored on the GPU memory. In some embodiments, the host is a CPU, database data and first database keys are stored on a disk data store, and second database keys are stored on the GPU memory. In some embodiments, methods further include synchronizing the first database keys with the second database keys. In some embodiments, the host is a database node, first database data and first database keys are stored on a disk data store, and second database data second database keys are stored on the GPU memory.

In other embodiments, computing device program products for parallel query execution of a database operation on a database utilizing a graphics processing unit (GPU) in coordination with a computing device are presented including: a computer readable medium; first programmatic instructions for receiving query by a host, the query including database relations; second programmatic instructions for starting a GPU kernel, where the GPU kernels include a GPU memory; third programmatic instructions for hash partitioning the database relations by the GPU kernel; fourth programmatic instructions for loading the hash partitioned database relations into the GPU memory; fifth programmatic instructions for loading keyed partitions corresponding the hash partitioned database relations into the GPU memory; sixth programmatic instructions for building a hash table for a smaller of the hash partitioned database relations; seventh programmatic instructions for executing the query; and eighth programmatic instructions for returning a result of the query, where the programmatic instruction are stored on the computer readable storage medium.

In other embodiments, GPU enabled database systems for parallel query execution are presented including: a database; a GPU in communication with the database, where the GPU is configured for processing a database query, where the GPU includes at least one GPU kernel, the at least GPU kernel including GPU memory, and where the GPU is configured for parallel processing the database query; and a host for receiving database queries.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
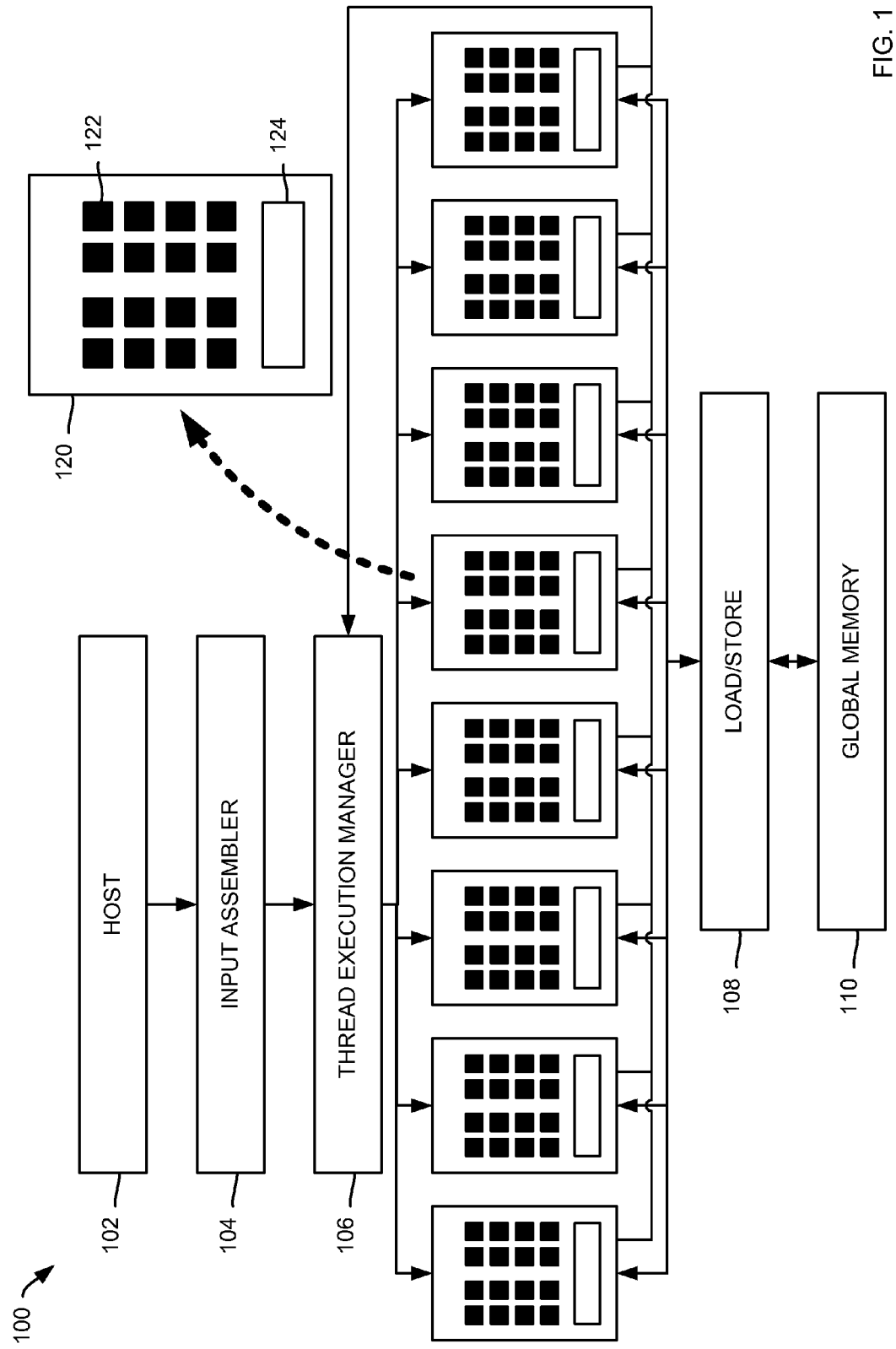
FIG. 1 is an illustrative representation of a G80 Architecture compliant GPU in accordance with embodiments of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks Referring now to the Figures, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Compute Unified Device Architecture (CUDA™) is a toolkit that allows general purpose programs written in a C-like language to be executed. CUDA™ toolkit exposes the underlying target hardware via a C-like API. CUDA™ is designed to increase performance in many data parallel applications by supporting execution of thousands of threads in parallel. As such, a compiled CUDA™ program may scale with the advances in hardware. There are at least two ways a GPU-enabled database may be implemented—a) in one embodiment, a full-fledged database system may be enabled, and b) a scratch pad for accelerating other database queries may be enabled, that is, a GPU-memory database for just executing database queries may be enabled.

FIG. 1 is an illustrative representation 100 of a G80 Architecture compliant graphics processing unit (GPU) in accordance with embodiments of the present invention. As illustrated, a G80 Architecture may include a number of components including: a host 102, a input assembler 104, a thread execution manager 106, a load/store 108, and a global memory 110. These components function in concert with a number of shared multiprocessors 120. A typical G80 Architecture compliant GPU may contain 128 stream processors 122 divided into 8 shared multiprocessors 120, each containing 16 streaming processors. Each shared multiprocessor 120 contains local shared memo 124 which is shared by the threads running on the shared multiprocessor. This is advantageous because it helps in coalesced access—when groups of threads operate on nearby data.

Figure 2:
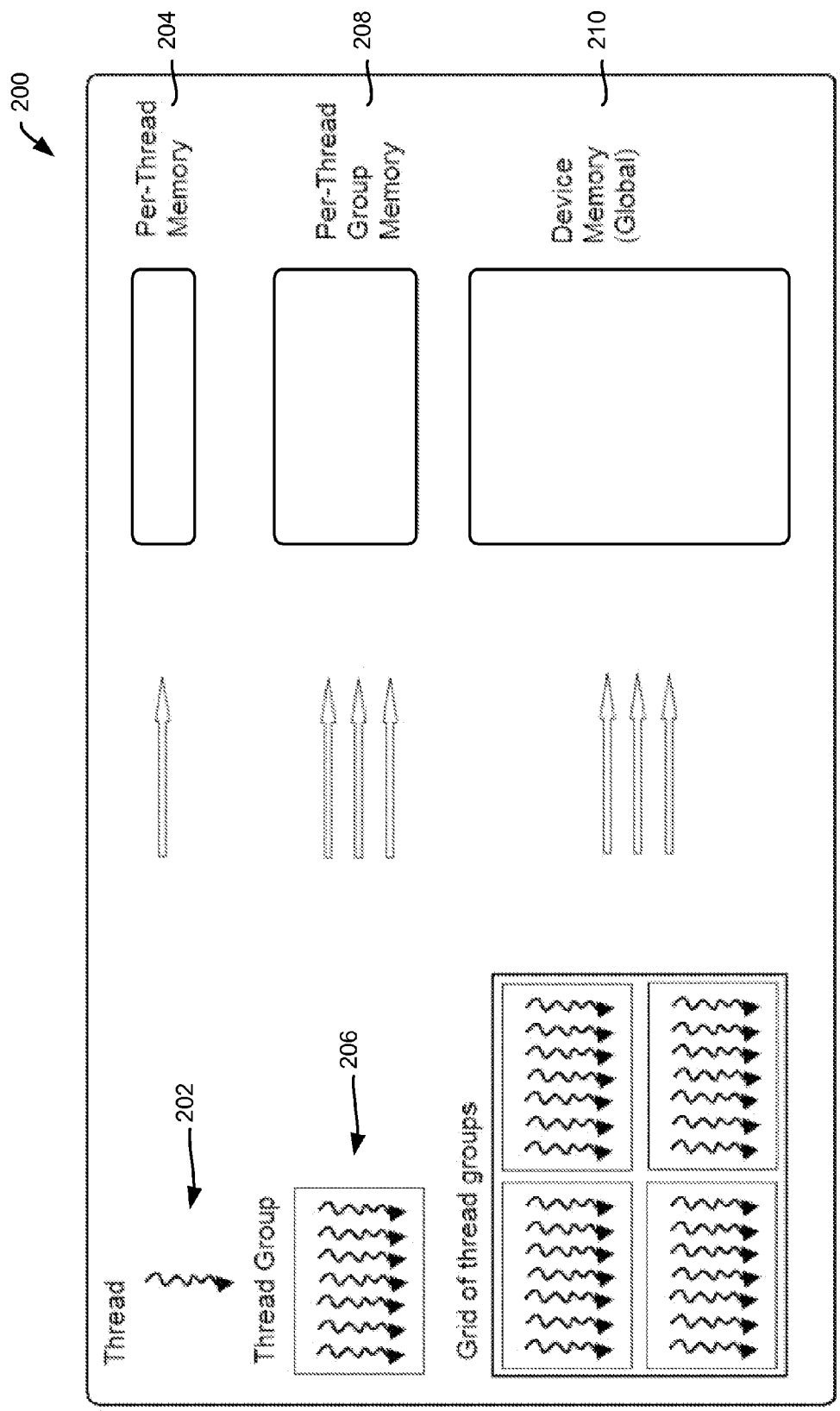
FIG. 2 is an illustrative representation of a memory hierarchy on a GPU in accordance with embodiments of the present invention.

FIG. 2 is an illustrative representation of a memory hierarchy 200 on a GPU in accordance with embodiments of the present invention. Memory hierarchy 200 includes per-thread memory 204, per-thread group memory 208, and global/device memory 210. Global/device memory 210 is accessible by any thread running on the GPU. Reads and writes to and from device memory 210 are slow as compared to other memories 204 and 208. GPU threads 208 are extremely lightweight as compared to CPU threads and hence there is essentially zero overhead in the creation of thousands of threads. Notably, threads are not run individually on a processor. Rather multiple threads are run in thread groups 206 called warps which are executed on a single shared multiprocessor (see FIG. 1, 120). Threads in a warp can share the memory local to the shared multiprocessor. This ability leads to an increase in performance because fewer reads/writes are made to the global memory to fetch and load data. That is, data is fetched once into a shared memory of the shared multiprocessor; computations are performed; and results are uploaded to the global memory.

Figure 3:
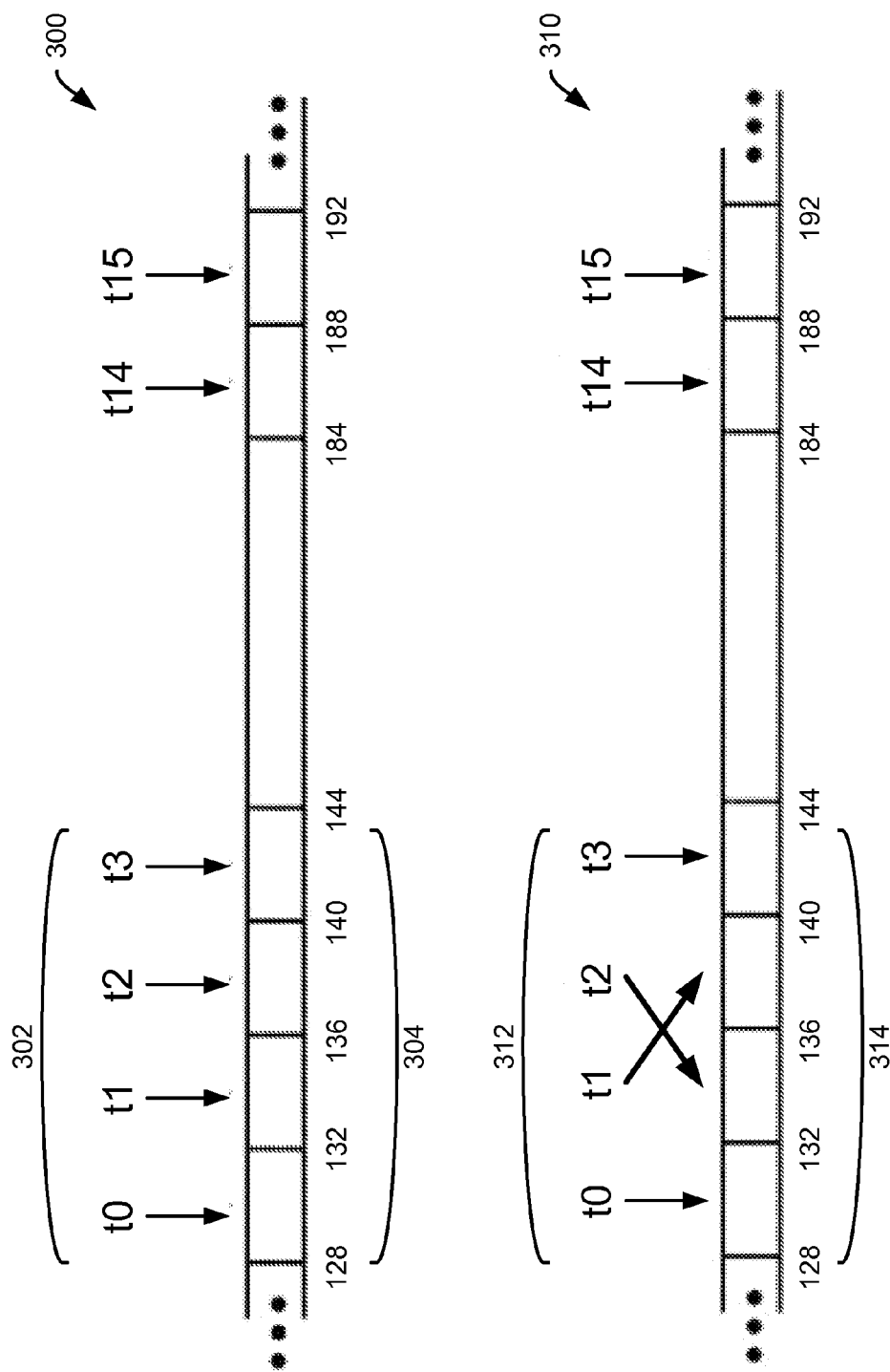
FIG. 3 is an illustrative representation of a coalesced memory pattern and a non-coalesced memory pattern in accordance with embodiments of the present invention.

Embodiments described herein optimize memory utilization by a) utilizing parallelism effectively and efficiently, and b) coalescing reads from global memory. In utilizing parallelism effectively, parallel execution of database operations are executed over as many threads as possible at any given time on a GPU. In coalescing reads from global memory, contiguous regions of global memory may be operated upon by threads in a thread group. FIG. 3 is an illustrative representation of a coalesced memory pattern 300 and a non-coalesced memory pattern 310 in accordance with embodiments of the present invention. In coalesced memory pattern 300, threads t0 to t3 302 are resident in order in memory 304. In contrast in non-coalesced memory pattern 310, threads t0 to t3 312 are resident out of order in memory 314. Coalesced memory patterns may provide processing efficiencies in some embodiments described herein. In some embodiments, hash partitioned relations may be loaded into GPU memory in a coalesced access pattern such that a contiguous region of GPU memory is utilized.

Figure 4:
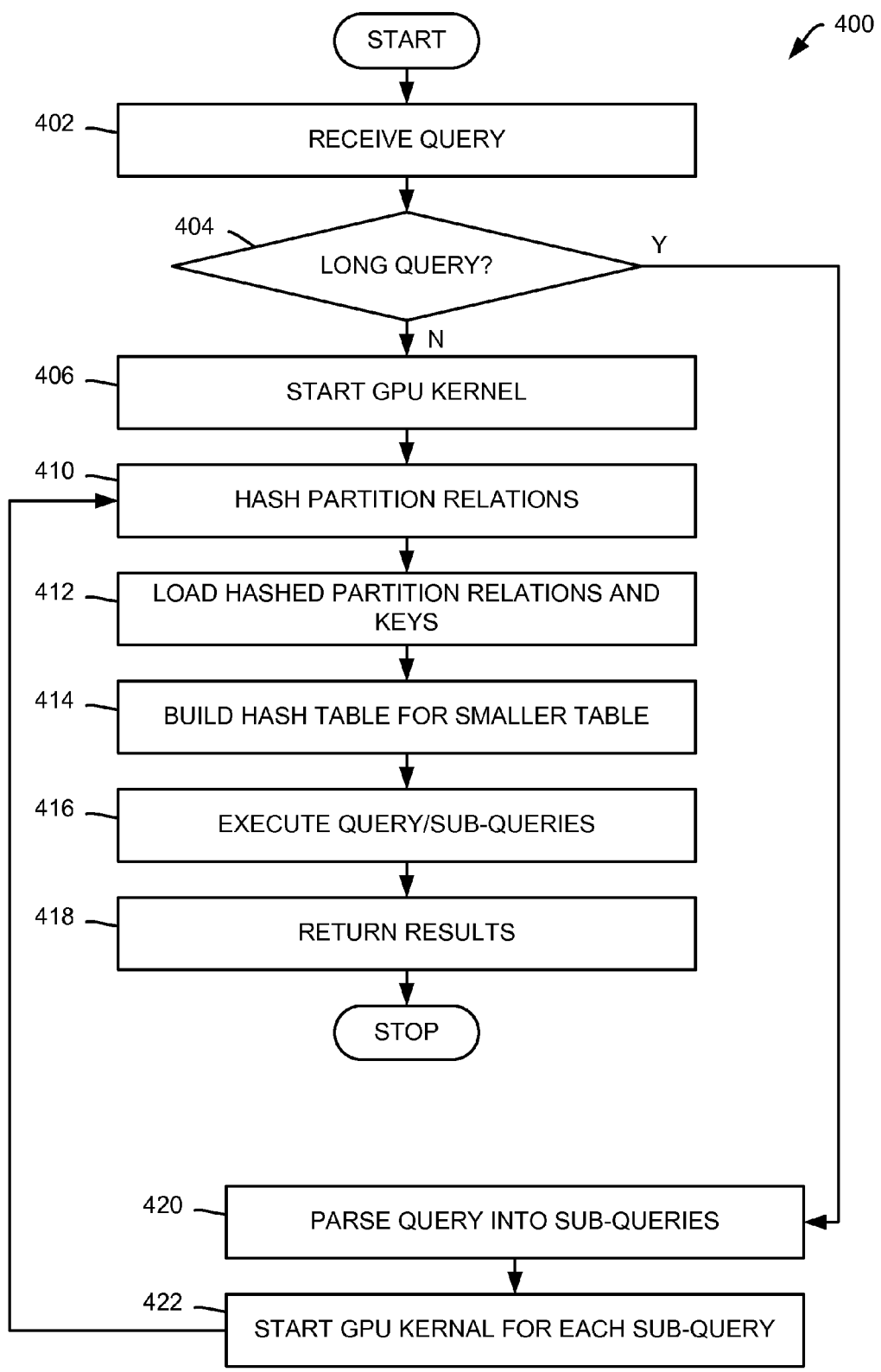
FIG. 4 is an illustrative flowchart of methods for providing GPU enabled database services in accordance with embodiments of the present invention.

FIG. 4 is an illustrative flowchart 400 of methods for providing GPU enabled database services in accordance with embodiments of the present invention. In particular, methods for parallel query execution of a database operation on a datable utilizing a GPU are illustrated. At a first step 402, the method receives a query. Queries may be received by a host in any manner known in the art without departing from the present invention. In embodiments, a query may include at least two database relations. At a next step 404, the method determines whether the received query is a long query. In embodiments, a long query may require additional processing steps. If the method determines at a step 404 that the query is not a long query, the method continues to a step 406 to start a GPU kernel whereupon the method continues to a step 410. If the method determines at a step 404 that the query is a long query, the method continues to a step 420 to parse the long query into a number of sub-queries. Partitioning long queries provides an advantage of executing queries in parallel across several GPU kernels. As such, at a next step 422, the method starts a GPU kernel for each sub-query. Sub-queries may be determined based on a variety of parameters in embodiments including, for example, size. That is, a sub-query may be determined based on whether the sub-query will fit into GPU memory.

The method continues to a step 410 to hash partition all relations by GPU kernel(s). Hash partitioning may be accomplished utilizing in any manner known in the art without departing from the present invention. At a next step 412, the method loads hashed partition relations and keys into GPU memory. At a next step 414, the method builds a hash table for the smaller table and, at a step 416, executes the query or sub-queries by GPU kernel(s). Results returned at a step 416 may be written first to GPU device memory and then host memory accessible by a user whereupon the method ends.

In one example embodiment, consider a case of a JOIN between two database relations R and S. Assume the relations are small-enough to fit into the GPU memory. Thus, the example is not a large query. Embodiments then hash partition both relations (R and S) and bring in the same keyed partition from both relations into GPU memory. Embodiments then build a hash table for the smaller table and probe the other relation for matches. In one embodiment, hash is performed on the join key. If relations are bigger than the available GPU memory, multiple hash functions may be utilized to reduce the size. In a case of a long query embodiment with many operators, the long query may be partitioned the query into several sub-queries that may be executed in parallel and then combined after processing.

It may be appreciated that at least some in-memory issues associated with GPU enabled database processing such as: table choice, concurrency, data volatility, and memory consumption. In embodiments utilizing CEILADB™, table choice may be tied to number of accesses/second made to the table. In further embodiments utilizing CEILADB™, concurrency may be compromised because thread blocks may be working in a same shared multiprocessor. As such, in embodiments, a call such as SYNCTHREADS (from a CUDA™ Library) will synchronize the threads in the same shared multiprocessor. However, any similar call may be made without departing from embodiments disclosed herein. If two threads from two different shared multiprocessors want to write data, they must synchronize through the global memory. In further embodiments utilizing CEILADB™, volatility may be solved by implementing a function that will store the data from the GPU to the disk. In further embodiments utilizing CEILADB™, memory consumption may be solved by enabling a user, at any time, to query the amount of memory being used by the tables created by the user. The user can also set memory consumption parameters which control the way data is written to memory or to disk—every time or when the used memory.

Figure 5:
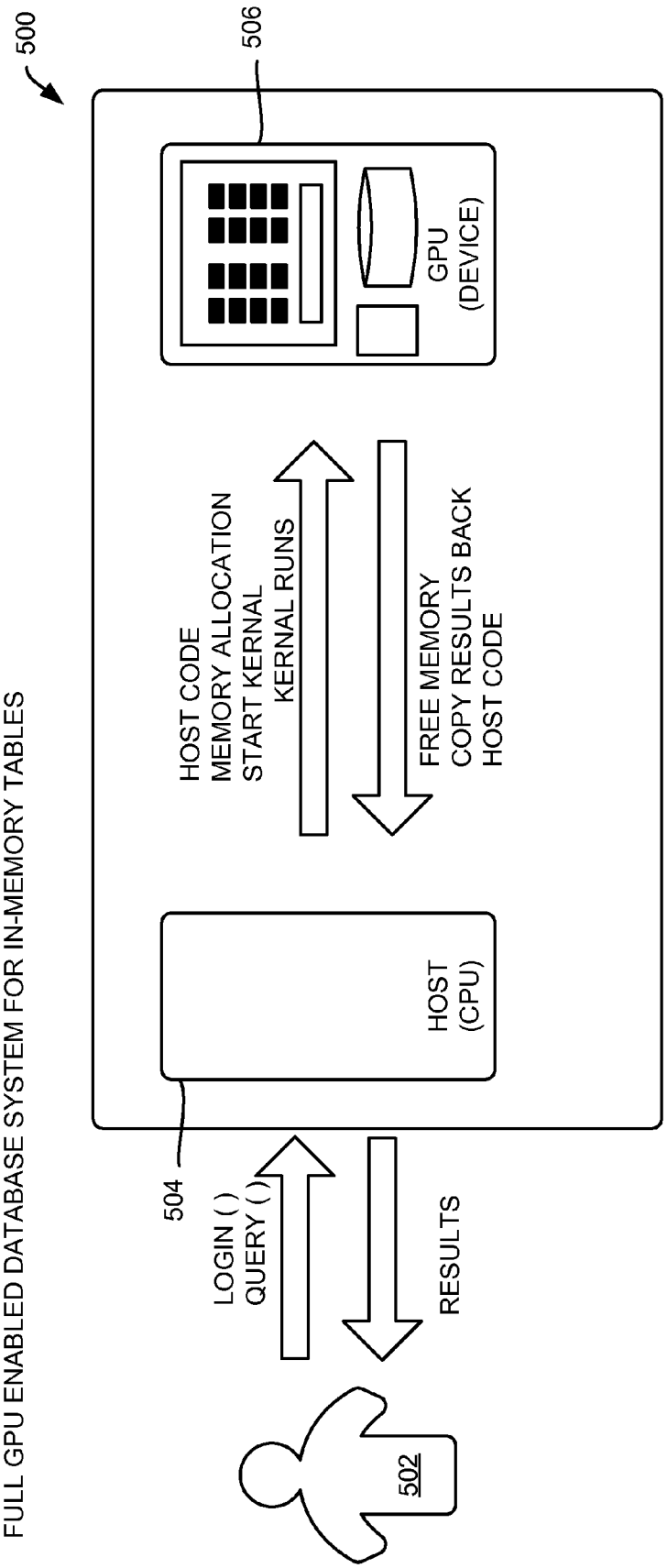
FIG. 5 is an illustrative representation of a full GPU enabled database system utilizing in-memory tables in accordance with embodiments of the present invention.

The following examples are provided for clarity in understanding embodiments of the present invention and should not be construed as limiting. FIG. 5 is an illustrative representation of a full GPU enabled database system 500 utilizing in-memory tables in accordance with embodiments of the present invention. In the illustrated embodiment, a user 502 may log on to host 504 either locally or remotely to make queries. In some embodiments, the host is a CPU. In some embodiments, queries are SQL-type queries. Queries may be sent to GPU 506, executed on GPU 506, and returned to host 504. Results may then be returned to user 502. As noted above, in embodiments, a GPU may be a G80 architecture compliant GPU. As illustrated, GPU 506 may be configured to utilize in-memory tables. As such, in embodiments, database data and database keys may be stored on the GPU memory, which memory may be shared in some embodiments. Because database data and database keys reside entirely in GPU memory, performance advantages may be achieved. However, due to the limited size of GPU memory, limitations in database table size may be required in embodiments. As noted above, in embodiments utilizing CEILADB™ memory consumption may be solved by enabling a user, at any time, to query the amount of memory being used by the tables created by the user. The user can also set memory consumption parameters which control the way data is written to memory or to disk—every time or when the used memory.

Figure 6:
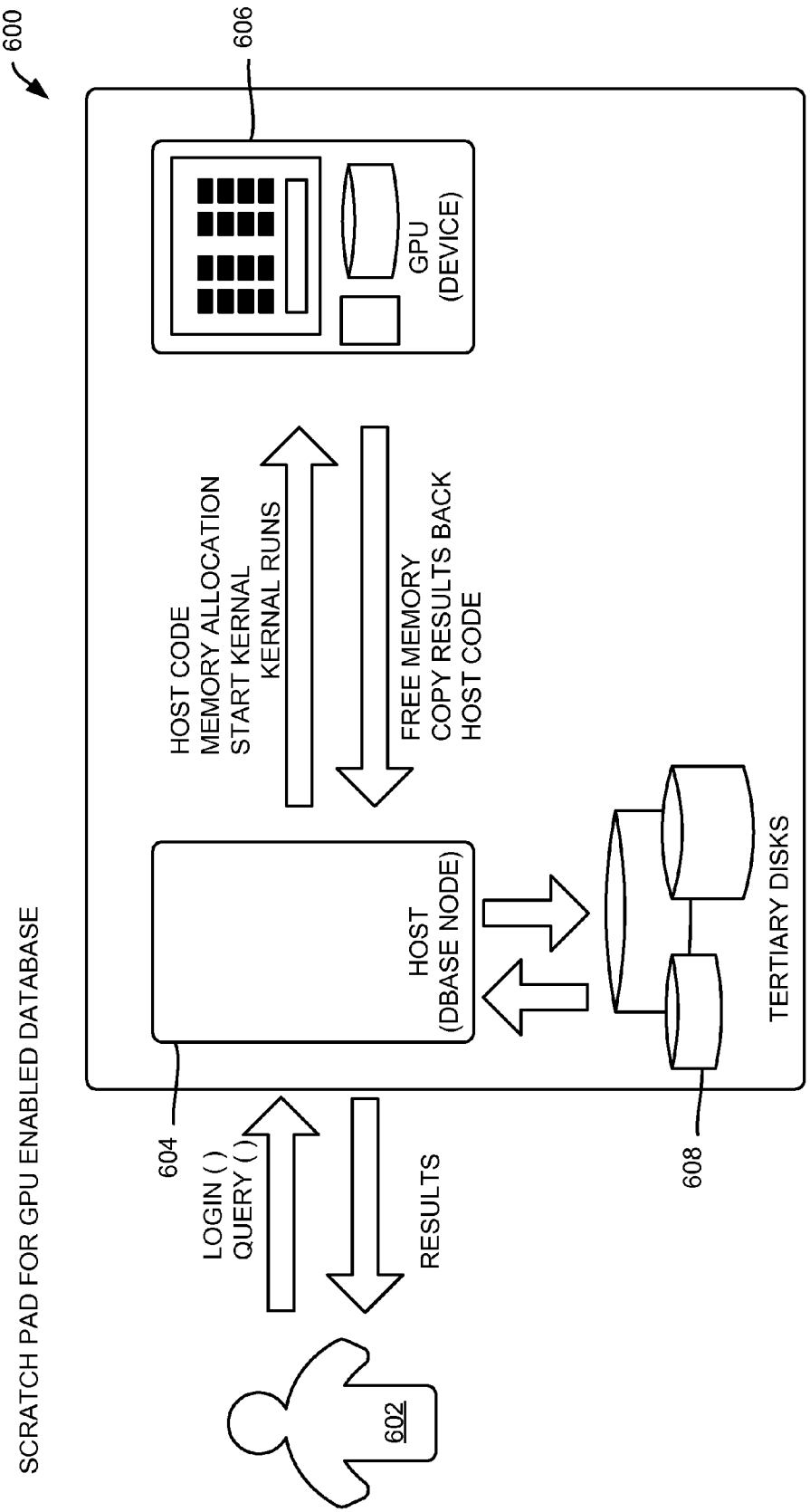
FIG. 6 is an illustrative representation of a scratch pad for a GPU enabled database system in accordance with embodiments of the present invention.

FIG. 6 is an illustrative representation of a scratch pad for a GPU enabled database system 600 in accordance with embodiments of the present invention. In the illustrated embodiment, a user 602 may log on to host 604 either locally or remotely to make queries. In some embodiments, the host is a database node. In some embodiments, queries are SQL-type queries. Queries may be sent to GPU 606, executed on GPU 606, and returned to host 604. Results may then be returned to user 602. As noted above, in embodiments, a GPU may be a G80 architecture compliant GPU. In this embodiment, a user may exploit the high computational power and memory bandwidth of the GPU for accelerating database queries of other database systems since the host, in this example, is a database node. As above, in embodiments, database data and database keys may be stored on the GPU memory, which memory may be shared in some embodiments. In addition, in embodiments, database data and database keys may be stored on the tertiary disks 608. In embodiments, in making queries to a commercial database, user 602 is unaware that queries are processed by GPU 606.

Figure 7:
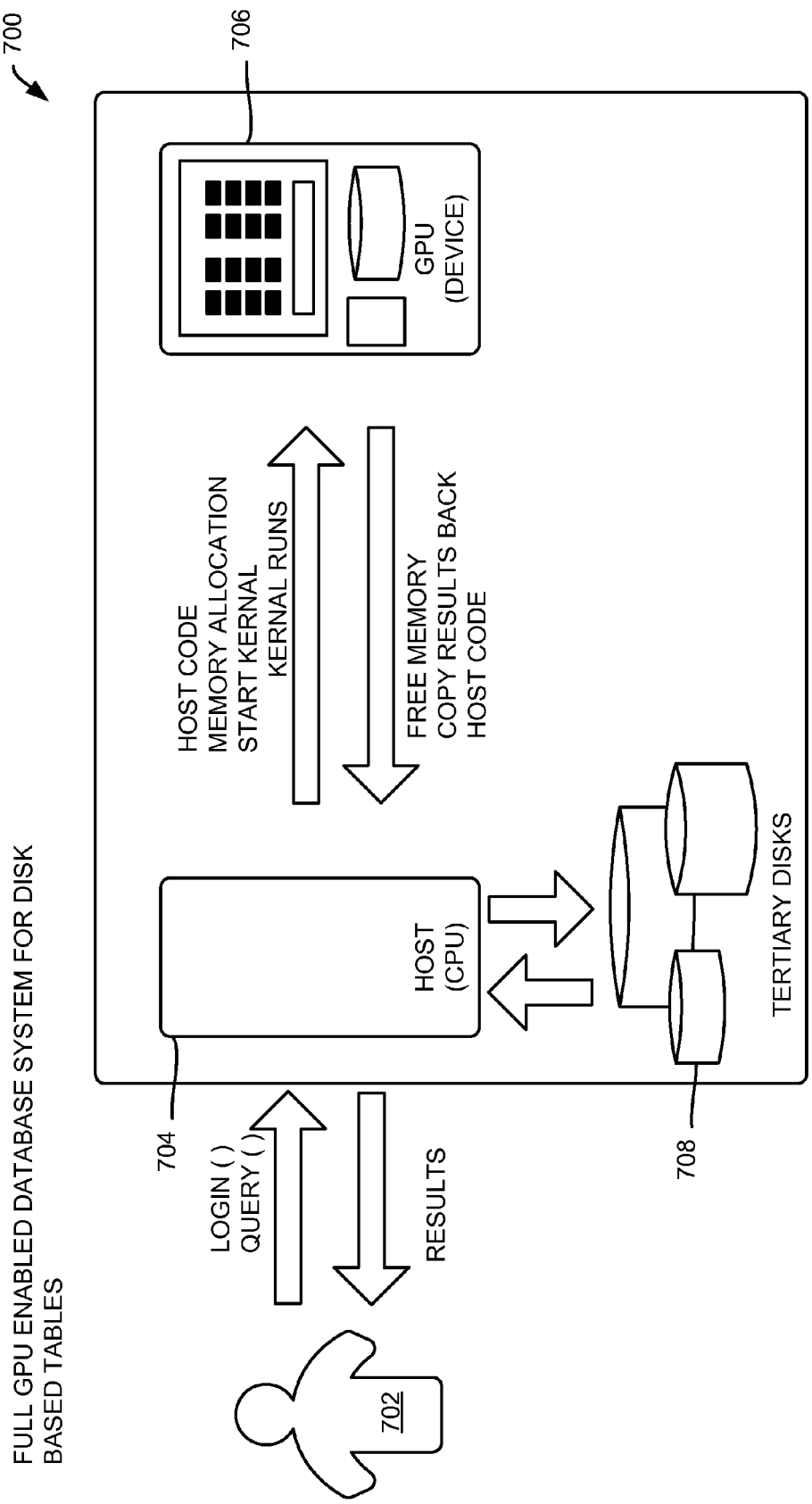
FIG. 7 is an illustrative representation of a full GPU enabled database system utilizing disk based tables in accordance with embodiments of the present invention.

FIG. 7 is an illustrative representation of a full GPU enabled database system 700 utilizing disk based tables in accordance with embodiments of the present invention. In the illustrated embodiment, a user 702 may log on to host 704 either locally or remotely to make queries. In some embodiments, the host is a CPU. In some embodiments, queries are SQL-type queries. Queries may be sent to GPU 706, executed on GPU 706, and returned to host 704. Results may then be returned to user 702. As noted above, in embodiments, a GPU may be a G80 architecture compliant GPU. In this embodiment, when a user is dealing with huge volumes of data, it may not be possible to store all the data in the GPU memory. Hence, in embodiments, database data and database keys may be stored on tertiary disks 708. In addition, in embodiments, database keys may be stored on GPU memory. As such, a host copy will be used when fetching data from the disks and GPU device copy will be used to access tuples in GPU memory. After insert operations to a database all copies must by synched to avoid inconsistencies. In some embodiments, it is imperative to pipeline the disk accesses with computations in order to achieve significant performance increases.

While this invention has been described in terms of several embodiments, there are alterations, permutations, and equivalents, which fall within the scope of this invention. It should also be noted that there are many alternative ways of implementing the methods, computer program products, and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for parallel query execution of a database operation on a database utilizing a graphics procession unit (GPU), the method comprising:
    receiving a query by a host, the query including at least two database relations;
    starting at least one GPU kernel of a plurality of GPU kernels, wherein the at least one GPU kernels include a GPU memory allocated at runtime;
    hash partitioning the at least two database relations by the GPU kernel resulting in at least two hash partitioned database relations, wherein each of the at least two hash partitioned database relations includes a partition key;
    loading the at least two hash partitioned database relations into the GPU memory;
    loading the at least two hash partitioned database relations and partition keys corresponding with the at least two hash partitioned database relations into the GPU memory;
    building a hash table for a smaller of the at least two hash partitioned database relations; and
    executing the query by the at least one GPU kernel thereby providing in hash table GPU memory access, wherein the parallel query execution of the database is performed solely by the GPU.

2. The method of claim 1 further comprising returning a result of the query.

3. The method of claim 1, further comprising:
    when the query is a long query including a plurality of operators, parsing the long query into a plurality of sub-queries;
    for each of the sub-queries, starting one of the at least one GPU kernels such that the sub-queries are processed in parallel; and
    returning to the hash partitioning.

4. The method of claim 1, wherein
    the host is a GPU, and wherein
    a database data and a plurality of database keys are stored on the GPU memory.

5. The method of claim 1, wherein
    the host is a GPU, wherein
    a database data and a first plurality of database keys are stored on a disk data store, and wherein
    a second plurality of database keys are stored on the GPU memory.

6. The method of claim 5, further comprising:
    synchronizing the first plurality of database keys with the second plurality of database keys.

7. The method of claim 1, wherein
    the host is a database node, wherein
    a first database data and a first plurality of database keys are stored on a disk data store, and wherein
    a second database data and a second plurality of database keys are stored on the GPU memory.

8. The method of claim 7 wherein the data disk store is pipelined with the GPU.

9. The method of claim 1, wherein the database is configured for logging transactions such that a roll back may be initiated if an inconsistent state occurs between the host and the GPU.

10. The method of claim 1, wherein the database is configured for limiting memory usage such that the query is restricted to a limited class of queries.

11. The method of claim 1, wherein the GPU is a G80 architecture compliant GPU.

12. The method of claim 1, wherein 1 the GPU memory is a shared memory for the at least one GPU kernels.

13. The method of claim 1, wherein the two hash partitioned relations are into the GPU memory in a coalesced access pattern such that a contiguous region of memory is utilized.

14. A computing device program product for parallel query execution of a database operation on a database utilizing a graphics processing unit (GPU) in coordination with a computing device, the computing device program product comprising:
a computer readable medium;
first programmatic instructions for receiving a query by a host, the query including at least two database relations;
second programmatic instructions for starting at least one GPU kernel of GPU kernels, wherein the at least one GPU kernels include a GPU memory allocated at runtime;
third programmatic instructions for hash partitioning the at least two database relations by the GPU kernel resulting in at least two hash partitioned database relations, wherein each of the at least two hash partitioned database relations, includes a partition key;
fourth programmatic instructions for loading the at least two hash partitioned database relations into the GPU memory;
fifth programmatic instructions for loading the at least two hash partitioned database relations and partition keys corresponding with the at least two hash partitioned database relations into the GPU memory;
sixth programmatic instructions for building a hash table for a smaller of the at least two hash partitioned database relations;
seventh programmatic instructions for executing the query by the at least one GPU kernel thereby providing in hash table CPU memory access, wherein the parallel query execution of the database is performed solely by the GPU; and
eighth programmatic instructions for returning a result of the query, wherein the programmatic instruction are stored on the computer readable storage medium.

15. The computer program of claim 14, further comprising:
when the query is a long query including a plurality of operators, ninth programmatic instructions for parsing the long query into a plurality of sub-queries;
for each of the sub-queries, tenth programmatic instructions for starting one of the at least one GPU kernels such that the sub-queries are processed in parallel; and
eleventh programmatic instructions for returning to the hash partitioning.

16. The computer program of claim 14, wherein
the host is a GPU, and wherein
a database data and a plurality of database keys are stored on the GPU memory.

17. The computer program of claim 14, further comprising:
twelfth programmatic instructions for synchronizing a first plurality of database keys with a second plurality of database keys, wherein
the host is a CPU, wherein
a database data and the first plurality of database keys are stored on a disk data store, and wherein
the second plurality of database keys are stored on the GPU memory.

18. The computer program of claim 14, wherein
the host is a database node, wherein
a first database data and a first plurality of database keys are stored on a disk data store, and wherein
a second database data and a second plurality of database keys are stored on the GPU memory.

19. A graphics processing unit (GPU) enabled database system for parallel query execution comprising:
a database;
a GPU in communication with the database, wherein
the GPU is configured for processing a database query, the processing including,
hash partitioning the at least two database relations by a GPU kernel resulting in at least two hash partitioned database relations, wherein each of the at least two hash partitioned database relations includes a partition key;
loading the at least two hash partitioned database relations into the GPU memory allocated at runtime;
loading the at least two hash partitioned database relations and partition keys corresponding with the at least two hash partitioned database relations into the GPU memory;
building a hash table for a smaller of the at least two hash partitioned database relations; and
executing the query by the at least one GPU kernel thereby providing in hash table GPU memory access, wherein the parallel query execution of the database is performed solely by the GPU, wherein
the GPU includes at least one GPU kernel of a plurality of GPU kernels, the at least GPU kernel including GPU memory allocated at runtime, and wherein
the GPU is configured for parallel processing the database query; and
a host for receiving database queries.

20. The system of claim 19, wherein
the host is a CPU, and wherein
a database data and a plurality of database keys are stored on the GPU memory.

21. The system of claim 19, wherein
the host is a CPU, wherein
a database data and a first plurality of database keys are stored on a disk data store, and wherein
a second plurality of database keys are stored on the GPU memory.

22. The system of claim 19, wherein
the host is a database node, wherein
a first database data and first plurality of database keys are stored on a disk data store, and wherein
a second database data and a second plurality of database keys are stored on the GPU memory.

* * * * *